(12) United States Patent
Solie et al.

(10) Patent No.: US 7,896,045 B2
(45) Date of Patent: Mar. 1, 2011

(54) APPARATUS FOR DELIVERING AIR THROUGH POWERED AXLE ASSEMBLIES

(75) Inventors: John B. Solie, Stillwater, OK (US); Marvin L. Stone, Stillwater, OK (US); Anthony Ingram, Guthrie, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 802 days.

(21) Appl. No.: 11/559,270

(22) Filed: Nov. 13, 2006

(65) Prior Publication Data
US 2008/0127773 A1 Jun. 5, 2008

(51) Int. Cl.
*B60C 23/10* (2006.01)

(52) U.S. Cl. ............................... 152/417; 152/416

(58) Field of Classification Search .......... 152/415–417
See application file for complete search history.

(56) References Cited

U.S. PATENT DOCUMENTS

| | | |
|---|---|---|
| 4,040,293 A | 8/1977 | Wilson |
| 4,088,009 A | 5/1978 | Fukuda |
| 4,167,114 A | 9/1979 | Zizine |
| 4,337,639 A | 7/1982 | Jackson |
| 4,431,043 A | 2/1984 | Goodell et al. |
| 4,441,539 A | 4/1984 | Hulse |
| 4,471,655 A | 9/1984 | Obayashi et al. |
| 4,574,267 A | 3/1986 | Jones |
| 4,619,303 A | 10/1986 | Bryan et al. |
| 4,640,331 A | 2/1987 | Braun et al. |
| 4,825,925 A | 5/1989 | Schultz |
| 4,860,579 A | 8/1989 | Beverly |
| 5,010,224 A | 4/1991 | Shirey et al. |
| 5,357,972 A | 10/1994 | Norlien |
| 5,377,736 A | 1/1995 | Stech |
| 5,386,742 A | 2/1995 | Irikura et al. |
| 5,461,932 A | 10/1995 | Hall et al. |
| 5,538,062 A | 7/1996 | Stech |
| 5,584,949 A | 12/1996 | Ingram |
| 5,722,417 A | 3/1998 | Garse |

(Continued)

FOREIGN PATENT DOCUMENTS

WO    WO 00/15451    3/2000

(Continued)

OTHER PUBLICATIONS

Khonsari et al., Applied Tribiology: Bearing Design and Lubrication, 2001, pp. 363-369, Publisher: John Wiley & Sons, Inc.

*Primary Examiner*—Jason R Bellinger
(74) *Attorney, Agent, or Firm*—Fellers, Snider, Blankenship, Bailey & Tippens, P.C.

(57) ABSTRACT

An apparatus for delivering air through a powered axle assembly and an improved powered axle assembly which incorporates the apparatus. The apparatus comprises: a base attachable to a non-rotating structure within the axle assembly and a rotor mountable in the axle assembly for rotating with the drive axle and for forming an air chamber between the rotor and the base. The base includes at least one air inlet for delivering air to the air chamber and the rotor includes at least one air outlet for air flow out of the chamber.

11 Claims, 9 Drawing Sheets

U.S. PATENT DOCUMENTS

| | | |
|---|---|---|
| 5,767,398 A | 6/1998 | Naedler |
| 5,868,881 A | 2/1999 | Bradley |
| 6,105,645 A | 8/2000 | Ingram |
| 6,164,142 A | 12/2000 | Dimeff |
| 6,182,727 B1 | 2/2001 | Beesley |
| 6,294,989 B1 | 9/2001 | Schofield et al. |
| 6,357,484 B1 | 3/2002 | Semerdjian |
| 6,363,985 B1 | 4/2002 | Beesley |
| 6,539,968 B1 | 4/2003 | White et al. |
| 6,561,017 B1 | 5/2003 | Claussen et al. |
| 6,585,019 B1 | 7/2003 | Ingram |
| 6,594,566 B1 | 7/2003 | Skoff |
| 6,598,462 B2 | 7/2003 | Williams |
| 6,601,460 B1 | 8/2003 | Materna |
| 6,640,588 B2 | 11/2003 | Semerdjian |
| 6,744,356 B2 | 6/2004 | Hamilton et al. |
| 6,774,774 B2 | 8/2004 | Schofield et al. |
| 6,778,075 B2 | 8/2004 | Headley et al. |
| 6,800,108 B2 | 10/2004 | Noda |
| 6,843,139 B2 | 1/2005 | Schumacher et al. |
| 6,938,658 B2 | 9/2005 | Jarrett et al. |
| 6,968,882 B2 | 11/2005 | Ingram |
| 2004/0007302 A1 | 1/2004 | Hamilton et al. |
| 2004/0244896 A1 | 12/2004 | Jarrett et al. |
| 2006/0005908 A1 | 1/2006 | Ingram |

FOREIGN PATENT DOCUMENTS

| | | |
|---|---|---|
| WO | US2007/83737 | 11/2007 |

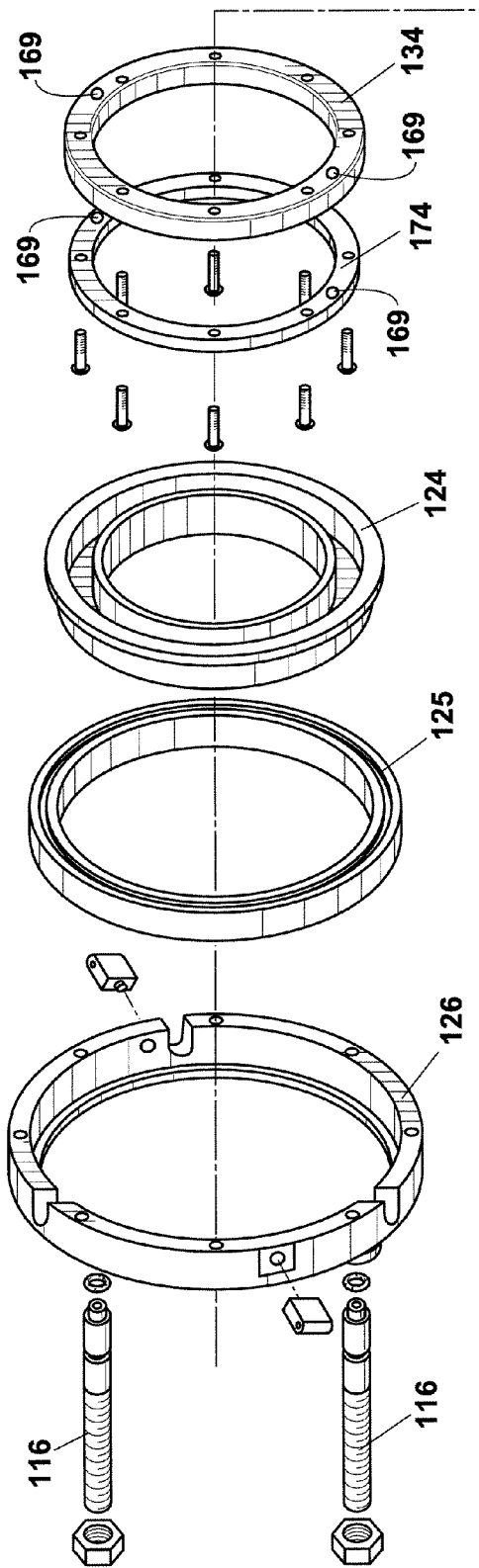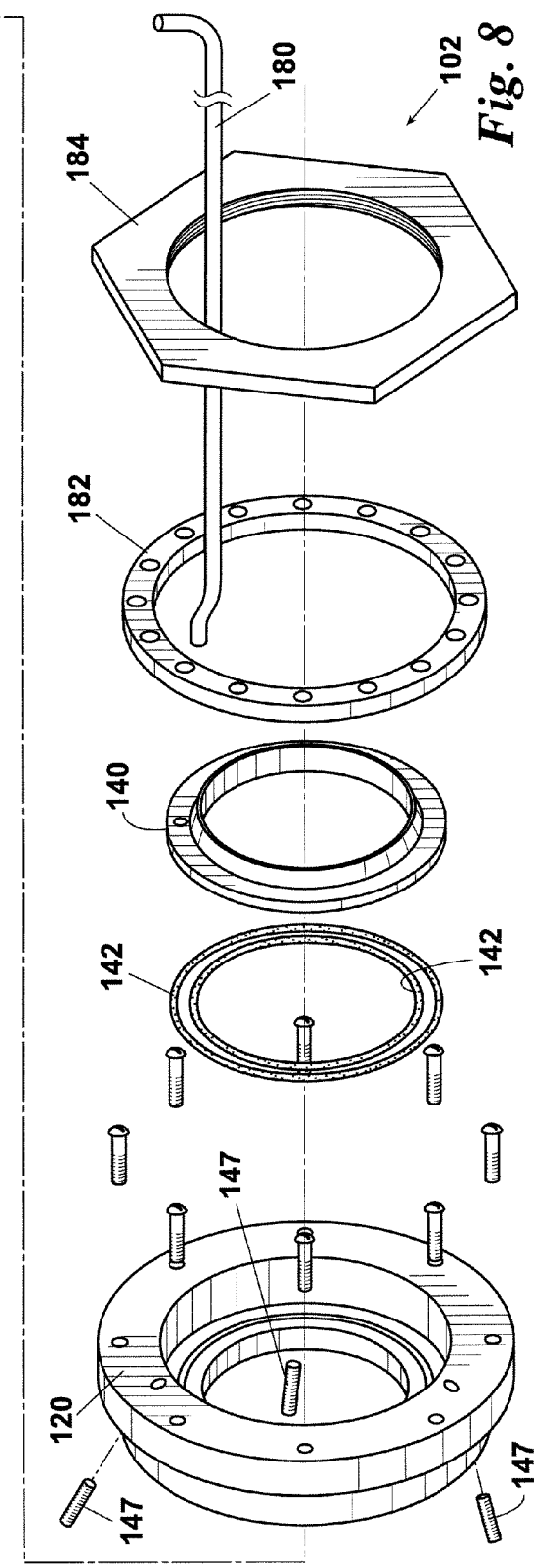
Fig. 8

US 7,896,045 B2

APPARATUS FOR DELIVERING AIR THROUGH POWERED AXLE ASSEMBLIES

FIELD OF THE INVENTION

The present invention relates to apparatuses for delivering air through powered axle assemblies and to improved powered axle assemblies having such apparatuses incorporated therein.

BACKGROUND OF THE INVENTION

Onboard automatic tire inflation systems are currently available for use on trucks and other vehicles. Such systems have been successfully used in non-powered vehicle axle assemblies (i.e., the axle assemblies of trucks or other vehicles which do not include powered drive shafts linked to the vehicle differential or other drive system) to deliver make-up air to a vehicle tire in the event that the tire is punctured or begins to leak for other reasons.

By way of example, an onboard system for maintaining a predetermined pressure in each of the tires of a non-powered truck tandem axle assembly is currently available from Airgo, Inc. of Edmond, Okla. The Airgo unit includes a tire inflation system which delivers compressed air from an onboard compressor (e.g., the compressor used for supplying air to the truck brakes) to the interior of the tandem axle, or to a tube extending through the axle, in the event that a leak occurs in any of the four tandem axle tires. The Airgo unit also includes: a pair of rotary seals provided proximate the outer ends of the non-powered tandem axle; a set of air lines extending from the rotary seals for delivering air from the interior of the axle, through the rotary seals, to each of the four tires; check valves provided in the air lines for preventing reverse air flow from the tires to the axle; and an indicator light which alerts the operator that a leak has developed. The system controls the make-up air flow in accordance with the operating pressure required by the tires. For most tandem truck axles, the automatic inflation system will typically be operable for providing a sufficient make-up air flow to maintain a tire pressure of at least 90 psig and more preferably at least 95 psig. An onboard automatic inflation system of this type is described, for example, in U.S. Pat. No. 6,105,645, the entire disclosure of which is incorporated herein by reference.

Although the rotary union employed in the Airgo system allows the use of onboard automatic tire inflation systems in non-powered axle assemblies, the development of a commercially viable system which would allow the use of such onboard automatic tire inflation systems in the powered drive axle assemblies of trucks and other vehicles has been problematic. We are not aware of any commercially viable systems which are currently in use for drive axle tire inflation for on-road trucks. Moreover, the available drive axle systems usable on other types of vehicles have significant shortcomings and disadvantages. For example, such systems (a) will typically inflate only during a portion of the revolution of the tire or only when the vehicle is stationary, (b) cannot operate at highway speeds, (c) do not provide continuous seal lubrication, (d) are not self contained, and/or (e) require external components which do not fit with the existing axle assembly.

Consequently, a need presently exists for a commercially viable device which will address and overcome these problems and limitations and will allow a flow of make-up air from an onboard tire inflation system to be automatically delivered through a drive axle assembly. Such device preferably will not interfere with the operation of the drive axle assembly and will preferably also be compatible for use with existing onboard automatic tire inflation systems. Further, the device will preferably be readily adaptable for use in two-wheel drive axle systems or in truck tandem axle systems having a pair of tandem wheels and tires mounted on each end thereof.

SUMMARY OF THE INVENTION

The present invention provides an apparatus for delivering air through a powered axle assembly which satisfies the needs and alleviates the problems discussed above. The inventive apparatus can be used in conjunction with onboard automatic tire inflation systems currently available and will not interfere with the operation of the drive axle assembly. Moreover, the inventive apparatus can be readily adapted for maintaining inflation in individual tires or in the dual or other multiple tire sets of the powered axle assemblies of trucks and other vehicles.

In one aspect, there is provided an apparatus for delivering air through a powered axle assembly, the powered axle assembly including a drive axle which extends through a non-rotating structure and is powered for rotation with respect to the non-rotating structure. The apparatus comprises a base attachable to a non-rotating structure. The apparatus also comprises a rotor mountable in a powered axle assembly for rotation with the drive axle such that the rotor will rotate with respect to the base and being configured so as to form an air chamber between the rotor and the base. The base includes at least one air inlet for delivering air into the air chamber and the rotor includes at least one air outlet for air flow out of the air chamber.

In another aspect, there is provided an improved powered axle assembly including a drive axle which extends through a non-rotating structure and is powered for rotation with respect to the non-rotating structure. The improvement comprises: a base attached to the non-rotating structure and a rotor mounted for rotation with the drive axle such that the rotor will rotate with respect to the base and being configured so as to form an air chamber between the rotor and the base. The improvement further comprises the base including at least one air inlet for delivering air into the air chamber and the rotor including at least one air outlet for air flow out of the air chamber.

Further aspects, features, and advantages of the present invention will be apparent to those of ordinary skill in the art upon examining the accompanying drawings and upon reading the following detailed description of the preferred embodiments.

BRIEF DESCRIPTION OF THE DRAWINGS

FIG. 8 is an exploded view of an alternative embodiment 102 of the inventive air delivery apparatus.

DETAILED DESCRIPTION OF THE PREFERRED EMBODIMENTS

Figure 1:
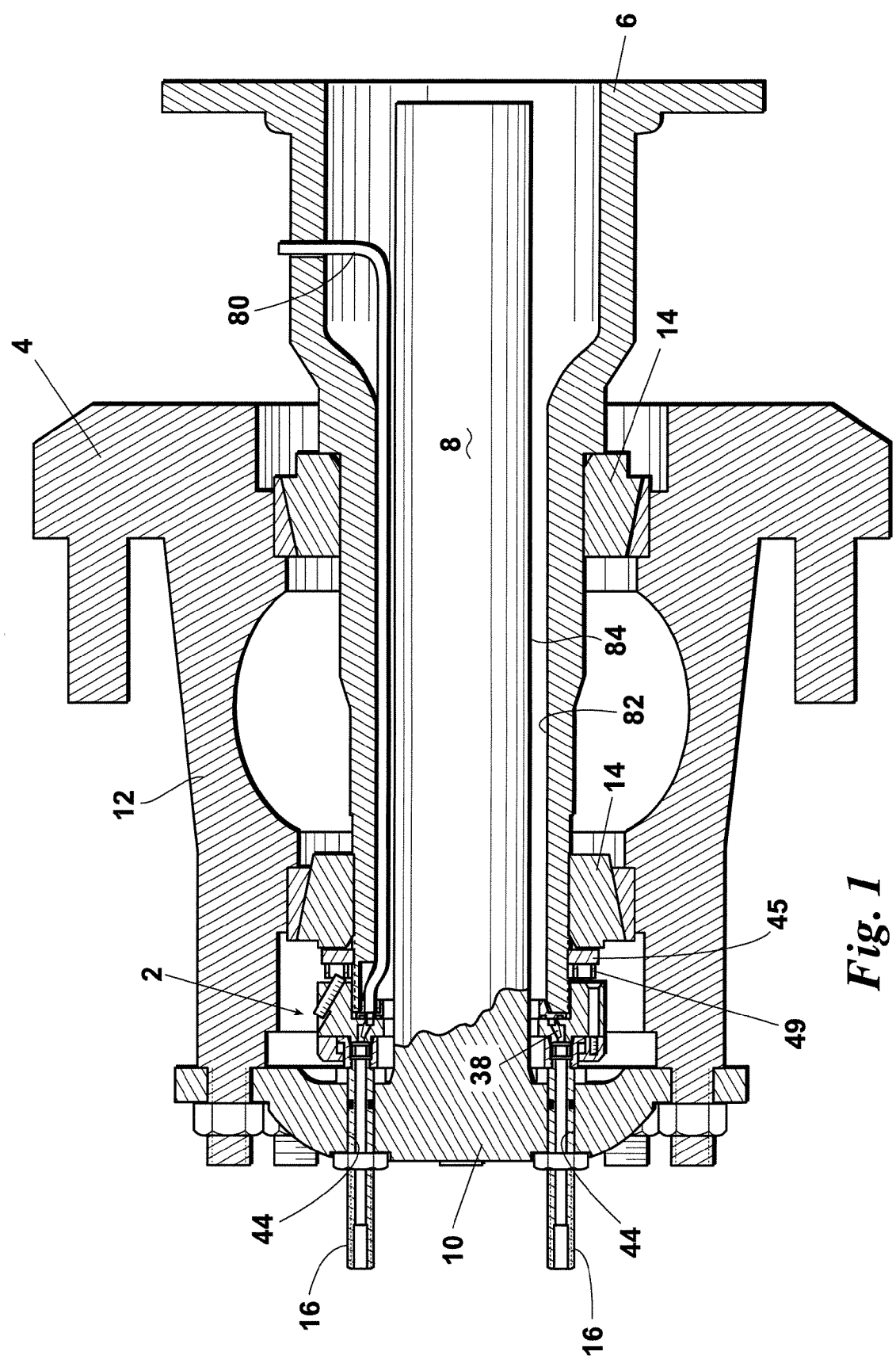
FIG. 1 is a cutaway elevational side view of a powered axle assembly 4 having an embodiment 2 of the inventive air delivery apparatus incorporated therein.
Figure 2:
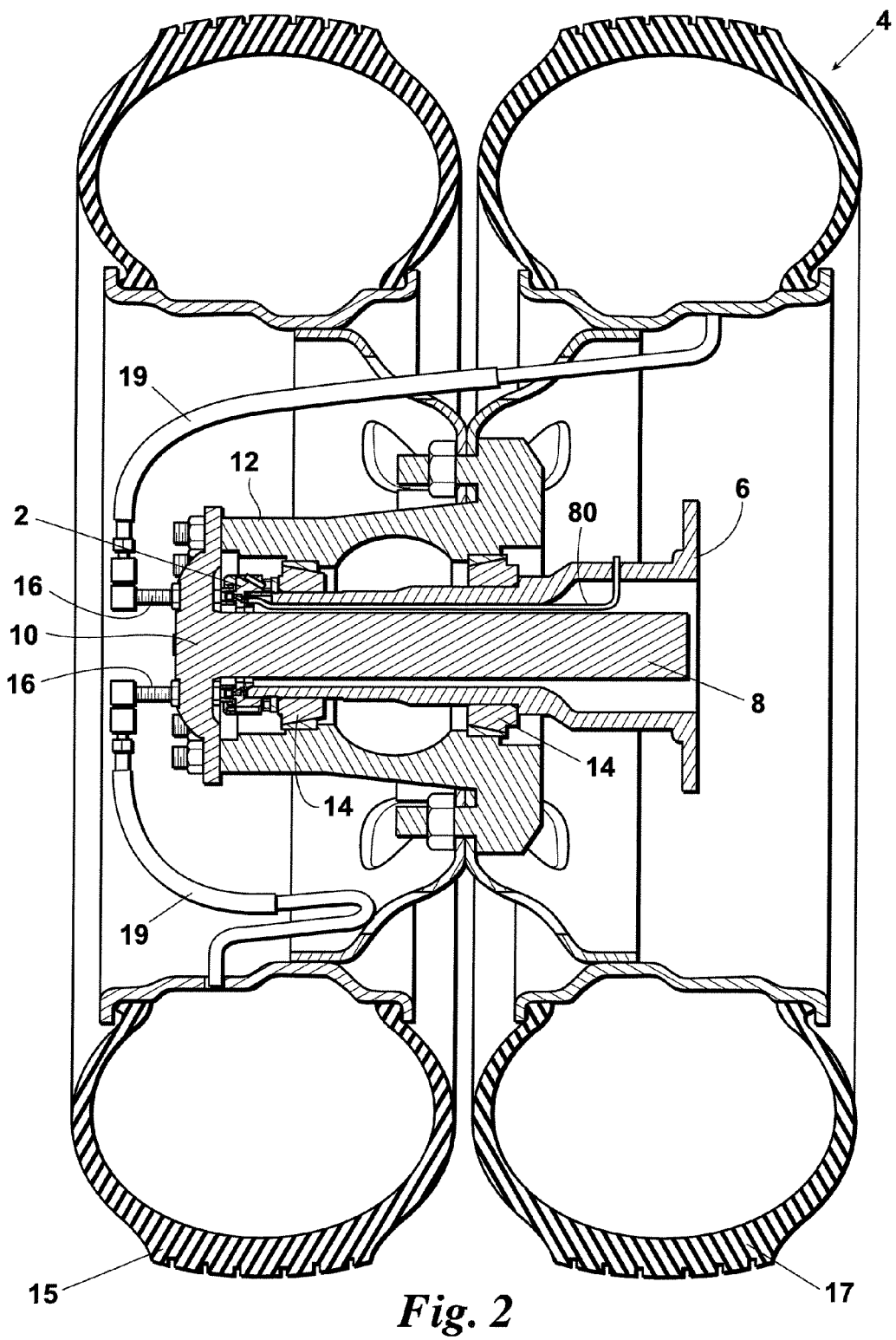
FIG. 2 is another cutaway elevational side view of the powered axle assembly 4 having the inventive air delivery apparatus 2 incorporated therein.
Figure 3:
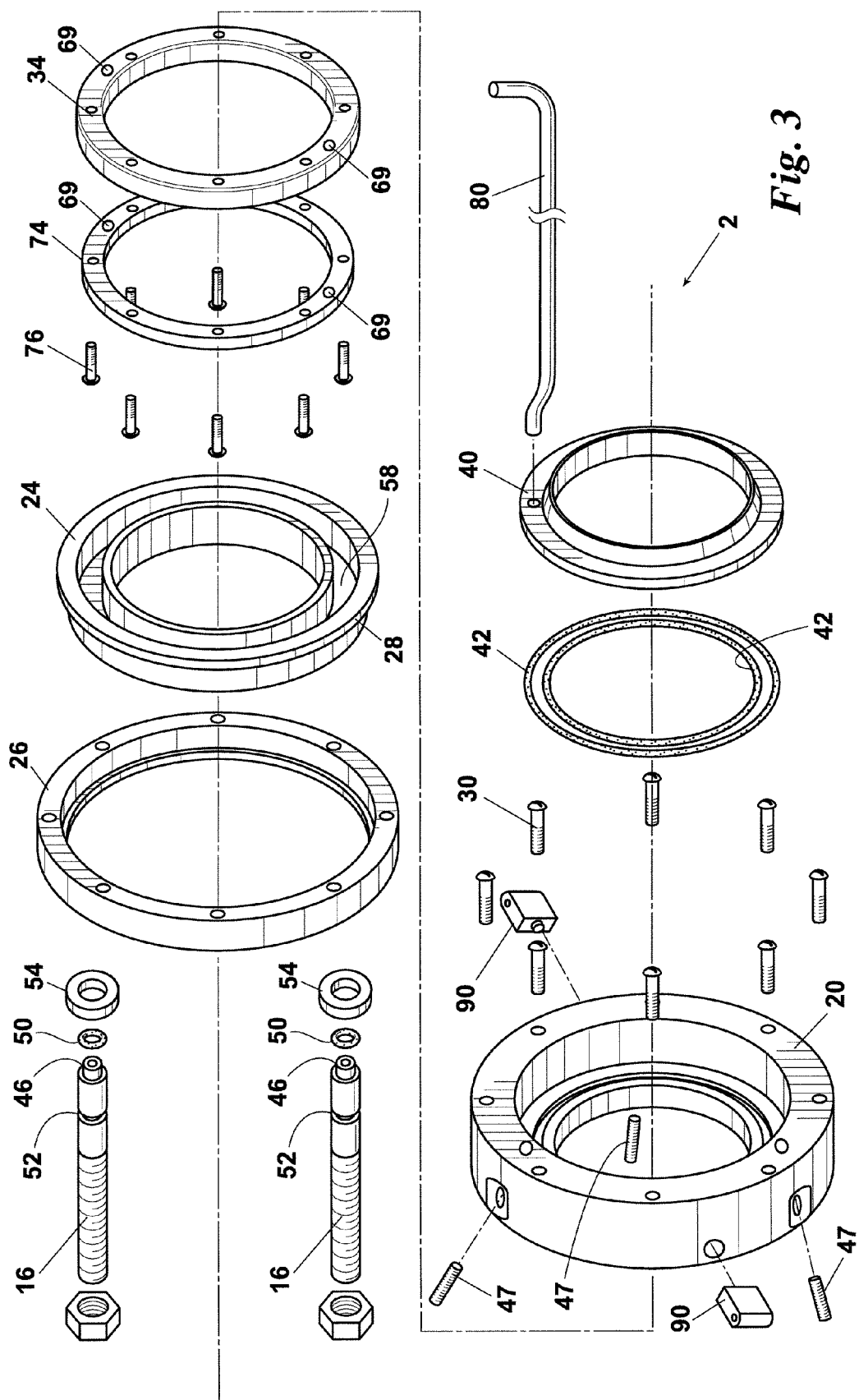
FIG. 3 is an exploded view of the inventive air delivery apparatus 2.
Figure 4:
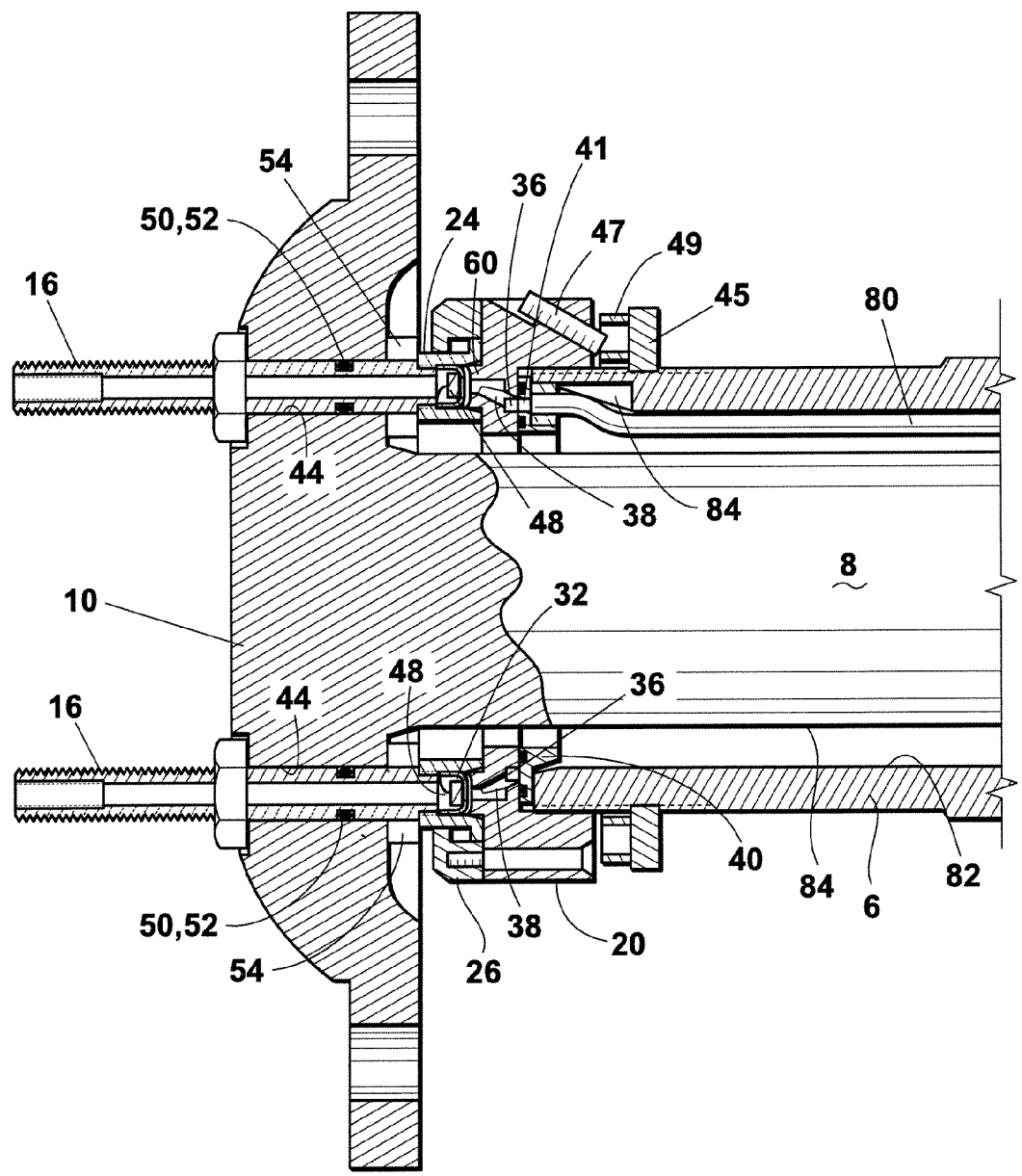
FIG. 4 is an assembled cutaway elevational side view of the inventive air delivery apparatus 2.
Figure 5:
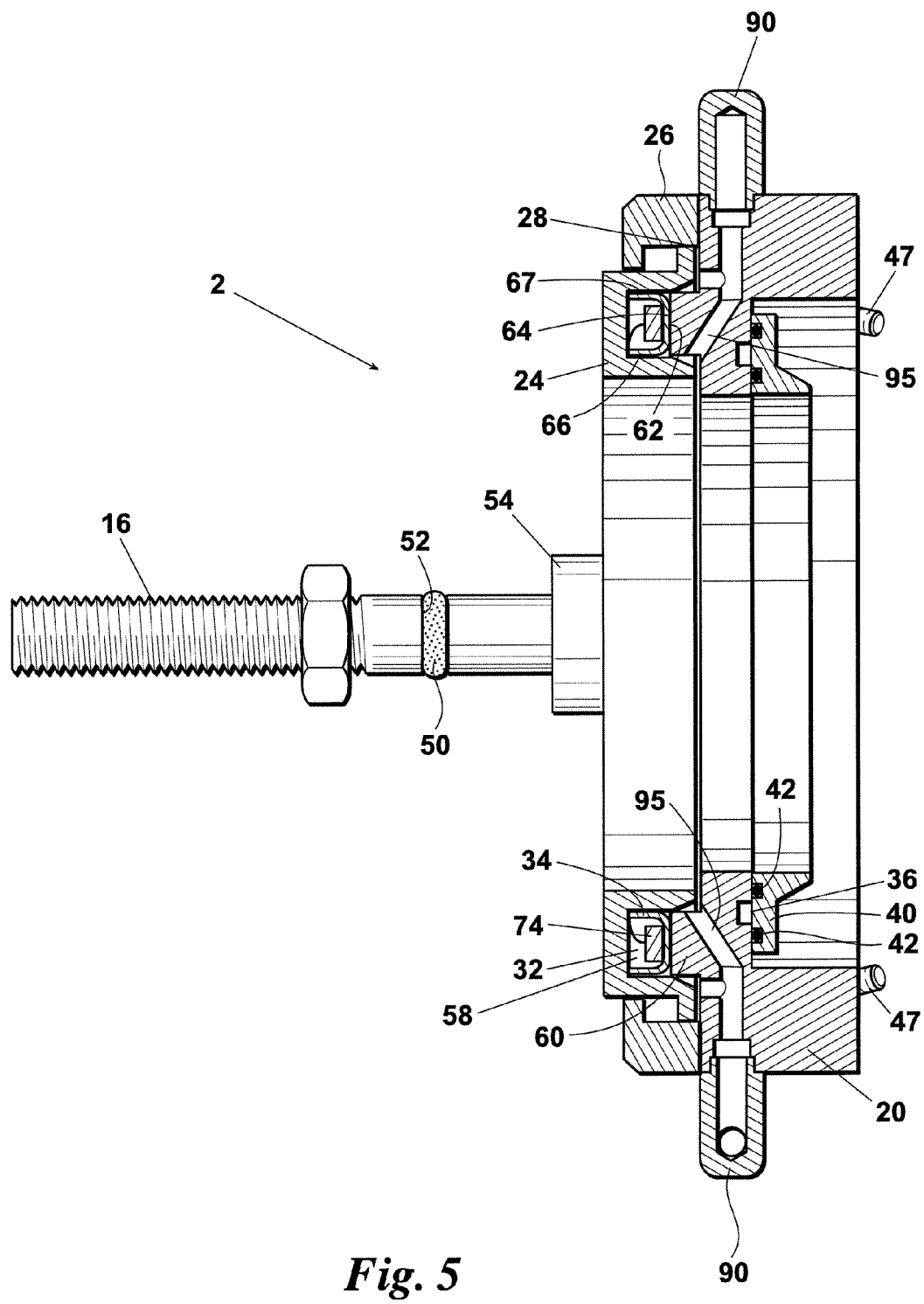
FIG. 5 is another cutaway elevational side view of the inventive air delivery apparatus rotated 90° from the position shown in FIG. 4.
Figure 6:
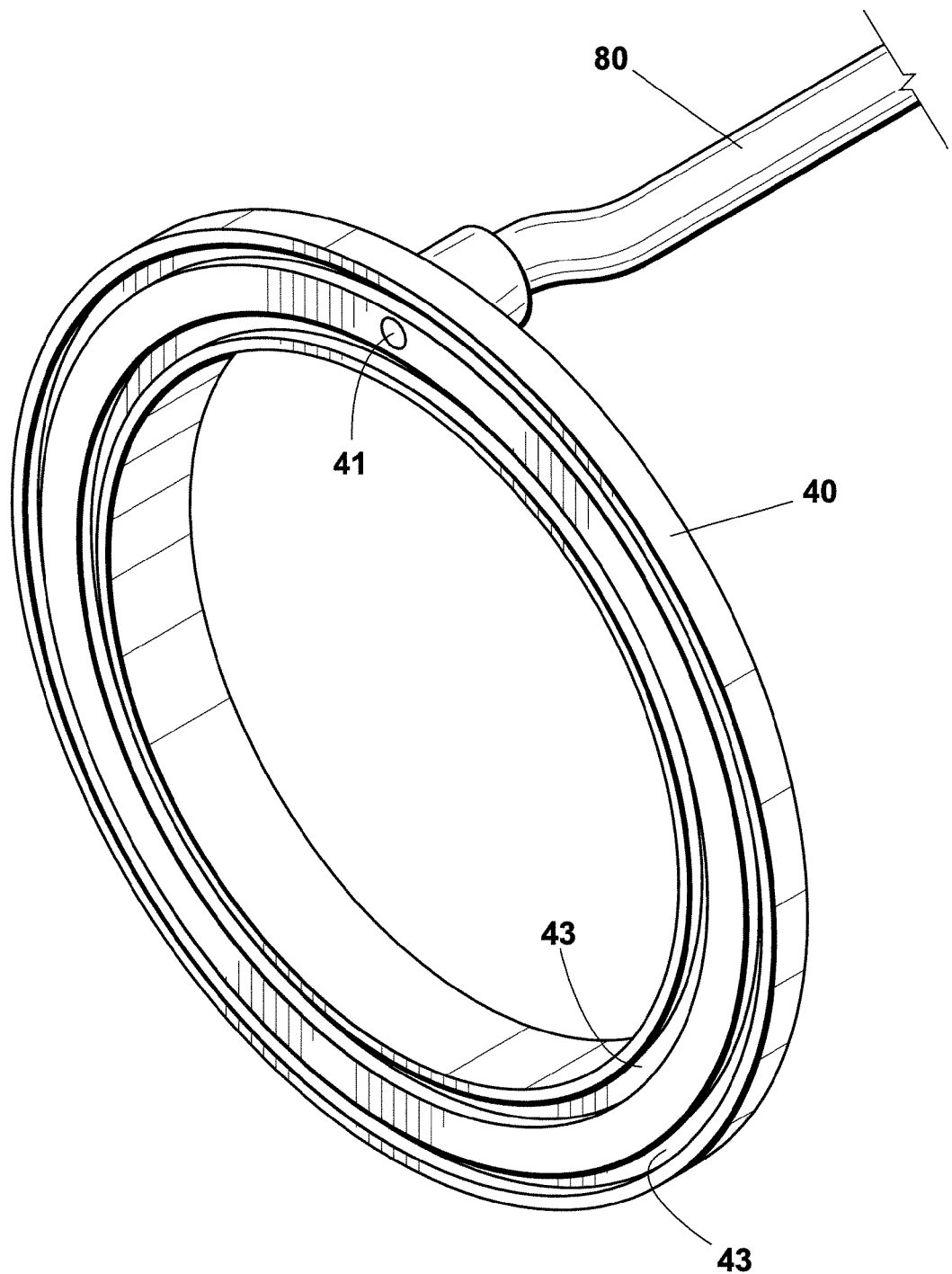
FIG. 6 is a perspective view of an inlet air coupler ring 40 employed in the inventive apparatus 2.

An embodiment 2 of the inventive apparatus for delivering air through a powered axle assembly is depicted in FIGS. 1-6. The inventive apparatus 2 is shown in FIGS. 1 and 2 as installed in a typical powered tandem axle assembly 4 used in trucks and other vehicles. As will be understood by those in the art, the powered axle assembly 4 comprises: a non-rotating structure 6 (e.g., a spindle or other housing); a powered drive axle 8 which extends through and rotates with respect to the non-rotating structure 6; a drive axle hub 10 which is provided on the outer end of and projects radially outward from the drive axle 8; a wheel hub 12 which is secured to the drive axle hub 10 for rotation with the powered drive axle 8; and tapered roller bearing(s) 14 which rotatably support the wheel hub 12 on the spindle 6. The powered tandem axle assembly 4 will also include a pair of wheels and tires 15 and 17 which will be mounted on the wheel hub 12.

The inventive air delivery apparatus 2 is effective for allowing air from an onboard automatic tire inflation system or other source to automatically flow through one or more air outlet tubes or other conduits 16 which extend through the drive axle hub 10. Flexible hoses or other conduits 19 can be readily secured to the outer ends of the air outlet tubes 16 for delivering air to the tires 15 and 17 of the powered axle assembly 4. As with the systems used heretofore for maintaining inflation in the tires of non-powered axles assemblies, check valves or other devices can be provided in the air lines 19 extending from the air outlet tubes 16 in order to prevent reverse air flow from the tires 15 and 17 to the axle.

The embodiment 2 of the inventive apparatus shown in FIGS. 1-6 comprises: a base 20 which is preferably threadedly connected on the outer end of the non-rotating structure 6 of the powered axle assembly 4; a rotor 24 which is mounted in the powered axle assembly 4 and is driven by the powered axle 8 such that the rotor 24 rotates with respect to the base 20 and with respect to the non-rotating structure 6; a rotor retainer 26 which is positioned over an outer lip ring 28 of the rotor 24 and is attached to the base 20 using screws 30 such that the rotor 24 will rotate within the retainer 26; an air chamber 32 which is formed between the rotor 24 and the base 20; a seal 34 provided within the air chamber 32 for sealing the air chamber; an air annulus 36 machined or otherwise provided in the base 20 for delivering air into the air chamber 32 via one or more air inlet passages 38 drilled or otherwise formed in the base 20; an inlet air coupler ring 40 which is positioned against the base 20 such that an air flow opening 41 provided in the coupler ring 40 mates with the air annulus 36 of the base 20; and a pair of O-ring seals 42 which are received in grooves 43 provided in the coupler ring 40 such that the seals 42 are positioned on opposite sides of, and operate to seal, the base air annulus 36. The function of the retainer 26 is to hold the assembly together when removed from the non-rotating structure 6.

The air outlet tubes 16 of the inventive apparatus 2 extend through axial bores 44 formed through the drive axle hub 10. The air outlet tubes 16 have inlet ends 46 which are connected to corresponding air outlet passageways or openings 48 provided through the rotor 24. The axial bores 44 can be sized such that the air outlet tubes 16 are permitted to pivot slightly and to move axially to some degree within the bores 44. O-rings 50 are positioned in radial grooves 52 formed around the air outlet tubes 16 in order to seal the axial bores 44 while allowing some pivoting and axial movement of the air tubes 16.

In addition to permitting air flow from the air chamber 32 to the exterior of the powered axle assembly 4, the positioning of the outlet air tubes 16 through the drive axle hub 10 also links the rotor 24 with the powered drive axle 8 to thus cause the rotor 24 to rotate with the drive axle 8 and to align the rotor 24 relative to the axis of rotation of the drive axle 8. Standoff washers 54 are provided around the inlet ends 46 of the air outlet tubes 16 in order to transmit the thrust of the rotor 24 resulting from the air pressure within the air chamber 32 to the drive axle 8.

The outlet air tubes 16 of the inventive air delivery apparatus 2 could alternatively extend radially through the hub 10. However, in addition to the operational benefits already discussed, the outlet air tubes 16 preferably extend axially to prevent interference when removing a wheel 15 or 17 from the hub 12, e.g., to replace a tire.

The threaded attachment of the base 20 on the distal end of the nonrotating structure 6 compresses the O-rings 42 held by the air connector ring 40 against the base 20 to thereby form a sealed air passage through the air annulus 36 and the air inlet passages(s) 38 and into the air chamber 32. In addition, in order to further ensure that the base 20 is locked on the spindle 6 and to prevent the locking nut 45 of the hub bearings assembly from loosening, a plurality of (preferably 3) locking set screws 47 are provided through the base 20 and are tightened against the wheel bearing lock ring 49.

The rotor 24 of the inventive apparatus preferably has a U-shaped interior 58 which is received over a corresponding ring 60 which projects axially from the forward face of the base 20. The rotor 24 and the base ring 60 are sized and configured such that the projecting ring 60 will close the rearward end of the U-shaped interior 58 of the rotor 24 but will leave a gap in the forward end of the rotor interior 58 sufficient to form the air chamber 32.

The interface within the air chamber 32 between the rotor 24 and the projecting base ring 60 is sealed by the seal element 34. The seal 34 can generally be any type of element capable of preventing air from escaping through the interface between the rotor 24 and the projecting base ring 60.

The seal element 34 will preferably be a double-lipped seal ring having a U-shaped cross section. The double-lipped seal 34 preferably comprises a radial base portion 62, which is attachable to the forward surface 64 of the projecting base ring 60, and a pair of generally cylindrical opposing lips 66 and 67. The lips 66 and 67 extend axially from the inner and outer circular edges of the radial base portion 62 of the seal 34 and preferably contact the interior axial side walls of the rotor 24. The seal 34 can be attached to the forward surface 64 of the projecting base ring 60 using a seal retaining ring 74 which is positioned in the interior of the seal 34 and is attached to the forward surface 64 of the projecting base ring 60 using screws 76. The seal base 62 and the seal retaining ring 74 also include corresponding apertures 69 which are positioned over the base air inlet passage(s) 38 to allow air flow into the air chamber 32.

The double-lipped seal 34 used in the inventive apparatus 2 can be formed of any material effective for conforming to the walls of the air chamber 32 and for sealing the interface between the base ring 60 and the interior 58 of the rotor 24. The material will also preferably have a low friction coefficient and high wear resistance. Examples of suitable materials include, but are not limited to: polytetrafluoroethylene (PTFE); mixtures of PTFE, glass fiber, and molybdenum disulfide; mixtures of PTFE and carbon; and rubber compounds such as VITON. The double-lipped seal 34 will most preferably be formed from PTFE impregnated with graphite.

Figure 7:
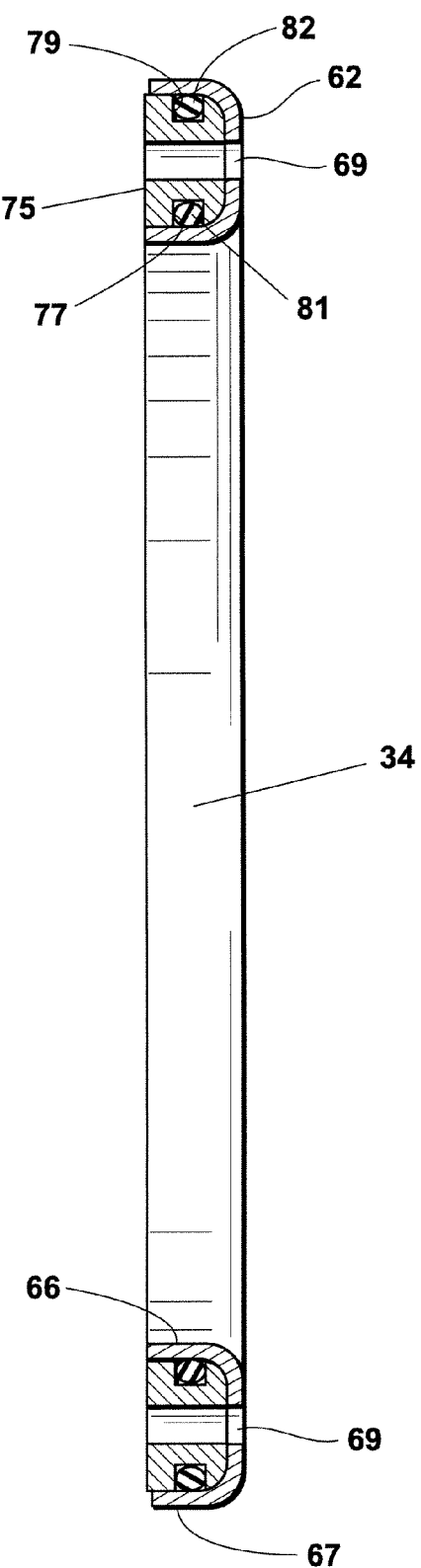
FIG. 7 is a cutaway elevational side view of an alternative air chamber seal assembly for use in the inventive air delivery apparatus.

An alternative embodiment of the seal assembly is shown in FIG. 7 wherein the seal retaining ring 74 within the double-lipped seal 34 is replaced with a seal backup ring 75. The seal backup ring 75 has grooves 77 and 79 formed in the inner and outer axial walls thereof wherein O-rings, preferably with low durometer values, mechanical springs, or similar elements 81 and 82 are received for holding the axial side walls 66 and 67 of the seal 34 against the interior faces of the rotor 24.

In yet another alternative, the double-lipped seal 34 itself can be replaced, for example, with O-rings or similar elements (not shown) which are inserted into grooves milled or otherwise provided either in the inner and outer axial side walls of the base ring 60, in the rotor interior 58, or a combination thereof. The grooves can be perpendicular to the longitudinal axis of the base 20 but will preferably be formed at an angle of less than or more than 90° from the base axis in order to facilitate the application of lubricant to the elements.

The outer ring 28 of the rotor 24 and the corresponding interior of the rotor retainer 26 are preferably sized and configured to allow a limited range of axial movement of the rotor 24 on the projecting base ring 60. As mentioned above, the axial bores 44 for the air outlet tubes 16 extending through the drive axle hub 10 can be sized to allow such movement. The ability of the rotor 24 to adjust axially toward or away from the base 20 and the ability of the air outlet tubes 16 to pivot slightly within the axial bores 44 of the drive axle hub 10 provide three degrees of freedom which make the inventive apparatus 2 particularly effective for compensating for substantially any misalignment which may occur between the inventive apparatus 2, the non-rotating structure 6, and/or the drive axle 8, or for compensating for distortions caused by heat or other factors.

Although the inventive apparatus 2 has been described as having a rotor 24 with a U-shaped interior cavity 58 which is received over a ring 60 which projects from the non-rotating base 20, it will be understood by those in the art that the interior cavity could be other than U-shaped and/or that the cavity and ring features could be reversed or inverted. For example, the rotating component of the inventive air delivery apparatus can include an axially projecting ring structure and the non-rotating component can include a corresponding open cavity structure wherein the ring projecting from the rotating member is received.

As another benefit of the inventive apparatus 2, the air pressure within the air chamber 32 urges the rotor 24 forward against the interior side of the drive axle hub 10 such that substantially all resulting axial forces and thrust loads produced by the inventive system are transferred to, and borne by, the existing tapered roller bearing(s) 14 which rotatably support the wheel hub 12. The inventive apparatus 2 thus does not require the use of separate thrust bearings and/or rotor alignment bearings.

Air from an onboard automatic tire inflation system or other source is supplied to the inventive apparatus 2 by air inlet tube 80 which is attached to the inlet air coupler ring 40. The air inlet tube 80 preferably extends through the non-rotating structure 6 between the interior wall 82 thereof and the exterior wall 84 of the drive axle 8. A recess 84 is preferably provided in the forward end of the interior wall 82 of the non-rotating structure 6 for facilitating the connection of the distal end of the air tube 80 to the air coupler ring 40.

Thus, in the event that a tire leak or puncture occurs, make-up air from the onboard automatic tire inflation system will flow sequentially through the air inlet tube 80, the air flow opening 41 in the inlet air coupler ring 40, the air annulus 36 of the base 20, inlet air passages 38 formed in the base 20, apertures 69 provided through the double-lipped seal element 34 and the seal retaining ring 74, the air chamber 32, the air outlet tubes 16, the air lines 19, and into the tire(s) 15 and/or 17.

Rather than using an inlet air tube 80, an inlet air passageway for delivering air to the inventive apparatus 2 could alternatively be drilled or bored axially through the non-rotating structure 6 itself and/or the air coupler ring structures could be machined into the face of the nonrotating structure 6 and the air coupler ring 40 eliminated.

Although lubricating oil will typically be contained within the wheel hub 12, the centrifugal force produced by the rotation of the wheel hub 12 during operation will prevent the oil from reaching the rotor 24 of the inventive apparatus 2. Thus, in order to lubricate and cool the rotor 24 and associated components, the base 20 of the inventive apparatus will preferably also include one or more oil collecting devices 90. The oil collecting device will continuously collect oil from the interior of the wheel hub 12 and deliver the collected oil to the rotor 24 via one or more oil passageways 95 drilled or otherwise formed through the base 20. Alternatively, if an O-ring arrangement of the type mentioned above is used rather than a double-lipped seal 34, the lubricating oil will be circulated between the O-rings.

Examples of oil collecting devices and systems suitable for use in the inventive apparatus 2 include but are not limited to: pitot tubes, tubing elbows, and machined blocks with 90° oil galleries. The oil collecting devices 90 will preferably be machined blocks with 90° oil galleries which will extend outwardly into the oil which is held by centrifugal force against the rotating interior wall of the wheel hub 12. The oil collecting devices 90 operate to scoop oil into the inventive apparatus 2 as the oil rotates with the wheel hub 12.

As will be understood by those in the art, the rotor 24 and related components of the inventive air delivery device 2 could alternatively be operated without a seal lubrication system by, for example, using a seal 34 with a low coefficient of friction and by conducting the heat produced by seal friction away from the seal 34 through, e.g., the air outlet tubes 16 to fins outside of the axle hub.

Figure 9:
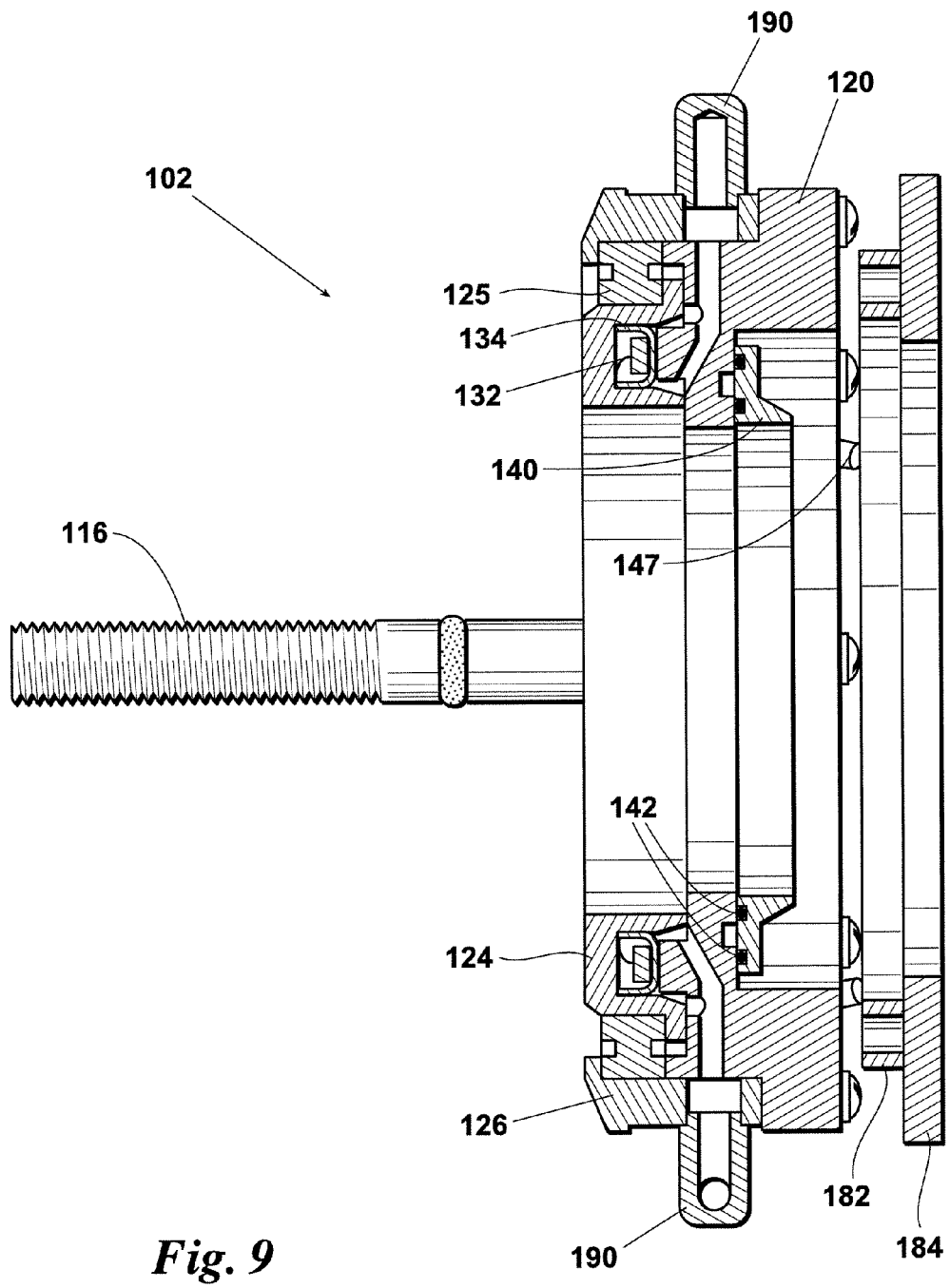
FIG. 9 is a cutaway elevational side view of the inventive air delivery apparatus 102.

An alternative embodiment 102 of the inventive apparatus for delivering air through a powered axle assembly is shown in FIGS. 8 and 9. The inventive air delivery apparatus 102 is similar to the inventive apparatus 2 except that the inventive apparatus 102 employs a ball bearing assembly 125 which transfers axial load to the stationary base 120 via the rotor retainer 126. The inventive air delivery apparatus 102 is particularly well suited, for example, for use in powered axle assemblies wherein the wheel bearings are packed with grease.

As with the inventive apparatus 2, the inventive air delivery apparatus 102 comprises: air outlet conduits 116 extending through the drive axle hub; a base 120 threadedly connected on the outer end of the spindle; a rotor 124 which rotates with the powered axle; a rotor retainer 126 which, in this case, retains both the rotor 124 and the bearing 125; an air chamber 132 formed between the rotor 124 and the base 120; a seal 134 within the air chamber 132; an inlet air coupler ring 140 having an inlet air tube 180 connected thereto; and a pair of 0-ring seals 142 positioned in the inlet air coupler ring 140 against the base 120.

In the inventive air delivery apparatus 102, the bearing assembly 125 is installed between the rotor 124 and the rotor retainer 126 for rotation of the rotor 124 with respect to the base 120 and the rotor retainer 126.

The inventive assembly 102 can employ the same type of oil collectors and lubrication system as inventive apparatus 2 for lubricating both the seal 134 and the bearing 125. Alternatively, as with the inventive apparatus 2, the need for such lubrication can be eliminated through the use of a packed bearing 125 and a seal 134 formed from a low friction material of the type discussed above.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. In a powered axle assembly including a drive axle which extends longitudinally through a non-rotating structure and is powered for rotation within said non-rotating structure, a drive axle hub provided at an axial outer end of said drive axle which rotates with said drive axle and is positioned outside of an outer end of said non-rotating structure, a wheel hub secured to said drive axle hub and extending axially rearward, and at least one bearing which supports said wheel hub on an exterior of said non-rotating structure for rotation of said wheel hub around said exterior of said non-rotating structure, said wheel hub having a lubricating oil within an interior of said wheel hub, the improvement comprising:

a base attached to said non-rotating structure and having said drive axle extending therethrough, said base being positioned within said interior of said wheel hub;

a rotor having said drive axle extending therethrough and mounted within said interior of said wheel hub for rotation with said drive axle hub such that said rotor will rotate with respect to said base, said rotor being configured so as to form an air chamber between said rotor and said base, said air chamber encircling said drive axle and said air chamber being located within said interior of said wheel hub;

said base including at least one air inlet for delivering air into said air chamber; and said rotor including at least one air outlet for air flow out of said air chamber.

2. The powered axle assembly of claim 1 wherein the improvement further comprises said base including a projecting ring structure having an axially forward-facing radial surface and said rotor including a circular cavity having an axially rearward-facing open end which is received over said projecting ring structure such that said axially forward-facing radial surface substantially closes said axially rearward-facing open end of said circular cavity to form said air chamber but said axially forward-facing radial surface can move axially forward and rearward in said circular cavity.

3. The powered axle assembly of claim 2 wherein the improvement further comprises at least one seal extending axially forward from said axially forward-facing radial surface of said projecting ring structure into said cavity in a manner effective for sealing said air chamber.

4. The powered axle assembly of claim 1 wherein said bearing is a tapered roller bearing and wherein the improvement further comprises said rotor being mounted in a manner effective such that axial forces resulting from air pressure within said air chamber will be transferred to and borne by said tapered roller bearing.

5. The powered axle assembly of claim 1 wherein the improvement further comprises said base being threadedly secured on said outer end of said non-rotating structure.

6. The powered axle assembly of claim 1 wherein the improvement further comprises an air conduit extending longitudinally from said air outlet of said rotor through said drive axle hub.

7. The powered axle assembly of claim 1 wherein the improvement further comprises:

said rotor having at least two of said air outlets and two air conduits extending longitudinally from said two air outlets of said rotor through said drive axle hub.

8. The powered axle assembly of claim 1 wherein the improvement further comprises said rotor having an exterior radial ring extending radially therefrom and said powered axle assembly further comprising a retainer attached to said base and extending over said radial ring such that said retainer will retain said rotor on said base during disassembly of said apparatus, said retainer being configured to allow free rotation of said radial ring within said retainer.

9. The powered axle assembly of claim 1 wherein the improvement further comprises an oil collector extending from said base within said interior of said wheel hub such that said oil collector will collect said lubricating oil, as said lubricating oil rotates by centrifugal force with said wheel hub, for delivering said lubricating oil to said rotor.

10. The powered axle assembly of claim 9 wherein the improvement further comprises said oil collector being a machined block having an oil gallery provided therein.

11. The powered axle assembly of claim 9 wherein the improvement further comprises an oil passageway in said base for delivering said lubricating oil from said oil collector to said rotor.

* * * * *